Patented Jan. 11, 1944

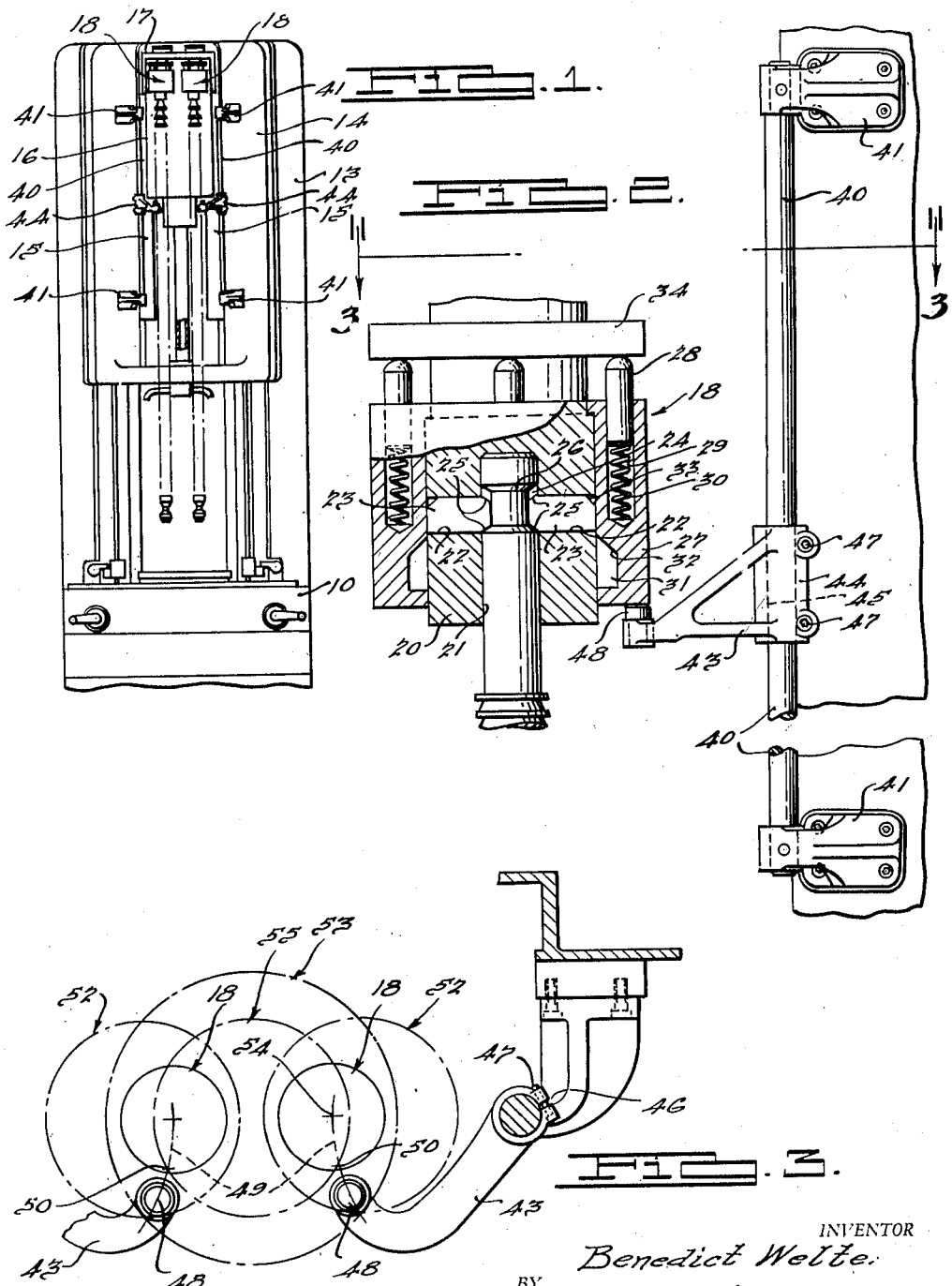

2,338,989

UNITED STATES PATENT OFFICE 2,338,989

RELEASE MECHANISM FOR BROACH PULLING CHUCKS

Benedict Welte, Lake Orion, Mich., assignor to Colonial Broach Company, Detroit, Mich., a corporation of Delaware Application June 17, 1943, Serial No. 491,148

2 Claims. (Cl. 90—33)

The present invention relates to broaching machines and particularly to an improved and simplified adjustable stop for releasing broach pulling and handling chucks.

It is standard practice to use a chuck or puller in pull broach machines which is provided with a sleeve slidable axially upon the chuck and adapted to engage and be shifted by a stop at the end of its stroke, which stop shifts the sleeve axially and releases the chuck. Since in adapting broaching machines for different operations the stroke of the various broach handling and pulling chucks is varied, it is desirable to provide a stop which is correspondingly adjustable in position. However, mere axial adjustability is not sufficient to adapt the stop to co-operate with chucks of varying diameters or chucks which are positioned with respect to the broaching ram in different positions and, consequently, it has generally been necessary to equip the machine with specially constructed stops for each operation it is required to perform.

It is the general object of the present invention to provide an exceedingly simple and practical adjustable stop mechanism which is universally applicable to a wide range of chuck diameters and locations and is also readily adjusted along the path of travel of the chuck in order to permit change in the stroke of the broach handling chuck.

Referring to the drawing, in which like numerals are used to designate like parts in the several views throughout:

Figure 1 is a fragmentary front elevation of a pull down broaching machine equipped with two pairs of chucks for handling two broaches simultaneously;

Figure 2 is an enlarged fragmentary front elevation of the chuck release means of the present invention; and Figure 3 is a fragmentary section taken on the line 3—3 of Figure 2, showing the manner in which the release means of the present invention may be adjusted to accommodate various size chucks and chucks of varying locations.

In the drawing, the invention is illustrated in connection with a vertical pull down broaching machine which is adapted to handle two broaches simultaneously. It will be understood, however, that the invention is applicable to any form of pull broach machine for handling one or two broaches.

The particular machine illustrated includes a work supporting table 10 and a vertically extending frame 13. A generally rectangular auxiliary framework 14 is carried on the front face of the frame 13 and includes a pair of ways 15 upon which is slidable a slide 16 carrying a bracket 17. The bracket 17, which may be of any desired form, carries the broach handling chucks 18 of the machine. The interior construction of these chucks, which is conventional, is shown best in Figure 2, wherein it will be seen that the cylindrical chuck body 20 contains a central bore 21 to receive the shank of the broach and a pair of transverse openings 22 in which are slidably positioned locking dogs 23. The inner ends of the locking dogs are received within an annular recess 24 in the shank of the broach and are provided with tapered portions 25 by which the locking dogs may be cammed outwardly by the correspondingly tapered side wall 26 of the recess 24 in the broach shank.

A cylindrical sleeve 27 surrounds the body 20 and is adapted in the locked position shown to hold the locking dogs 23 against disengagement from the recess 24. The sleeve 27 is held in the position illustrated by means of a plurality of plungers 28 mounted in bores 29 in the sleeve and urged outwardly by springs 30.

The lower portion of the interior of the sleeve 27 is provided with an annular groove 31 having a cam surface 32. The groove is so arranged that when the sleeve is forced upwardly against the action of the spring-pressed plungers 28, the groove will occupy a position in alignment with the transverse openings 22 and permit the dogs to move outwardly under the influence of the force exerted by the broach. When the sleeve 27 is released it is returned downwardly by the plungers 28, at which time the cam surface 32 engages with a similarly inclined cam surface 33 on the locking dogs and forces the dogs into the locking position illustrated. The plungers 28 normally engage a ring 34 secured in any desired manner to the body of the chuck.

As best shown in Figure 2, the chuck releasing mechanism of the present invention comprises a rod 40 fixed, by means of brackets 41, at each end to the front face of the frame 14 of the machine with the rod 40 extending parallel to the direction of travel of the broach handling chucks. In the machine illustrated the release mechanism is duplicated, there being provided a rod 40 at each side of the machine. However, since these release mechanisms are identical in construction, only one of them is shown in detail in Figures 2 and 3.

A bracket 43, having a boss 44 formed with an internal opening 45 at the side to receive the rod 40, is slidable upon the rod. The boss 44 is split, as best shown at 46 in Figure 3, and a pair of screws 47 is provided for closing the opening and thus clamping the boss to the rod 40 in any desired position. The extremity of the bracket 43 is provided at its end with a hardened button 48. The upper surface of the button is adapted to act as an abutment engaged by the sleeve 27 of the chuck 18.

As shown diagrammatically in Figure 3, the bracket 43 is not only adjustable vertically on the rod, but may be rotated about the axis of the rod in order to engage chucks of various sizes and locations. Thus, for example, there is illustrated by the two solid line circles indicated 18 the approximate position of the chucks 18 in the machine illustrated in Figure 1. As will be observed, the buttons 48 on bracket 43 may be swung along the arcuate path, indicated in dotted lines at 49, to the point marked 50 in order to engage the sleeve 27 of the chucks 18. The brackets 43 may, however, be swung outwardly to the position shown in Figure 3, in which they would engage a pair of substantially larger chucks, indicated by the dotted line circles 52. In that same position they may engage the release sleeve of a centrally located chuck of still larger size, indicated by the dotted line circle 53 and, when swung upwardly as viewed in Figure 3 to the point marked 54, the abutment surfaces 48 are in position to engage the release sleeve of a smaller centrally located chuck, indicated by the dotted line circle 55.

It will thus be seen that by simply swinging the brackets 43 about the bar 40 and adjusting them endwise along the bar the brackets, together with their abutment surfaces 48, may be adapted to co-operate with one or two chucks of any desired size or location. Once the brackets are adjusted to the desired angular and axial position, they are simply clamped in position by tightening screws 47 and remain in that position until it is necessary to change over the machine for a different broaching operation. Except where two chucks are mounted on a single bracket, as in the machine of Figure 1, only one release assembly, including the arm 40 and bracket 43, is required. The two are preferably provided in order to make possible the use of two handling chucks simultaneously. Moreover, even when only one chuck is used it is advantageous to have its release sleeve engaged at opposite sides by two buttons.

It will be appreciated that the two chucks 18, illustrated in Figure 1, are what is known as the "broach handling chucks" and that on their downward stroke they deliver the lower ends of the broaches to similarly constructed pulling chucks secured to the main ram of the machine and not shown in the drawing. A similar set of release assemblies is provided to operate the main pulling chucks. These release assemblies, however, do not appear in Figure 1 as they are located behind and beneath the table 10.

It will be apparent that while only one modification of the invention is shown and described herein, minor changes in the details of construction may be indulged in without departing from the spirit of the invention or the scope of the appended claims.

What is claimed is:

1. In a pull broaching machine having a reciprocating broach holding chuck provided with release means adapted to release the broach when the means strikes a stationary abutment, an adjustable abutment mechanism comprising a rod extending parallel to the path of travel of the chuck, an arm pivotally and slidably mounted on the rod, means on the free end of the arm for engaging and operating the chuck release means, and means to fix the arm in position on the rod.

2. In a pull broaching machine having a reciprocating broach holding chuck provided with a release sleeve adapted to release the broach when the sleeve strikes a stationary abutment, an adjustable abutment mechanism comprising a rod extending parallel to the path of travel of the chuck, an arm pivotally and slidably mounted on the rod, means on the free end of the arm for engaging and operating the chuck release sleeve, and means to fix the arm in position on the rod.

BENEDICT WELTE.